United States Patent [19]

Sung

[11] Patent Number: 5,948,377
[45] Date of Patent: Sep. 7, 1999

[54] CATALYST COMPOSITION

[75] Inventor: Shiang Sung, New York, N.Y.

[73] Assignee: Engelhard Corporation, Iselin, N.J.

[21] Appl. No.: 08/834,906

[22] Filed: Apr. 7, 1997

Related U.S. Application Data

[63] Continuation-in-part of application No. 08/706,480, Sep. 4, 1996.

[51] Int. Cl.$^6$ ............... B01J 23/40; B01J 23/10
[52] U.S. Cl. .............. 423/213.5; 502/302; 502/304; 502/326; 502/327; 502/333; 502/334; 502/339
[58] Field of Search .................... 502/304, 302, 502/330, 325, 326, 332, 333, 334, 327, 339; 423/213.5

[56] References Cited

U.S. PATENT DOCUMENTS

| | | | |
|---|---|---|---|
| 3,524,721 | 8/1970 | Stephens | 23/2 |
| 3,545,917 | 12/1970 | Stephens | 23/2 |
| 3,552,913 | 1/1971 | Stephens | 23/2 |
| 3,676,370 | 7/1972 | Stephens | 252/455 |
| 3,787,560 | 1/1974 | Stephens | 423/239 |
| 3,899,444 | 8/1975 | Stephens | 252/455 |
| 3,956,188 | 5/1976 | Hindin et al. | 252/465 |
| 3,993,572 | 11/1976 | Hindin et al. | 252/462 |
| 4,021,185 | 5/1977 | Hindin et al. | 431/7 |
| 4,134,860 | 1/1979 | Hindin et al. | 252/466 |
| 4,157,316 | 6/1979 | Thompson et al. | 252/462 |
| 4,171,288 | 10/1979 | Keith et al. | 252/462 |
| 4,189,404 | 2/1980 | Keith et al. | 252/462 |
| 4,294,726 | 10/1981 | Boxon et al. | 252/462 |
| 4,438,219 | 3/1984 | Brandenburg et al. | 502/333 |
| 4,476,246 | 10/1984 | Kim et al. | 502/304 |
| 4,504,598 | 3/1985 | Ono et al. | 502/303 |
| 4,587,231 | 5/1986 | Sawamura et al. | 502/304 |
| 4,591,518 | 5/1986 | Schillinger et al. | 427/385.5 |
| 4,591,578 | 5/1986 | Foley et al. | 502/185 |
| 4,591,580 | 5/1986 | Kim et al. | 502/303 |
| 4,624,940 | 11/1986 | Wan et al. | 502/251 |
| 4,708,946 | 11/1987 | Ohata et al. | 502/304 |
| 4,714,694 | 12/1987 | Wan et al. | 502/304 |
| 4,727,052 | 2/1988 | Wan et al. | 502/327 |
| 4,757,045 | 7/1988 | Turner et al. | 502/252 |
| 4,780,447 | 10/1988 | Kim et al. | 502/243 |
| 4,806,519 | 2/1989 | Chiba et al. | 502/252 |
| 4,808,564 | 2/1989 | Matsumoto et al. | 502/303 |
| 4,923,842 | 5/1990 | Summers | 502/261 |
| 4,965,243 | 10/1990 | Yamada et al. | 502/304 |
| 5,057,483 | 10/1991 | Wan | 502/304 |
| 5,212,142 | 5/1993 | Dettling | 502/304 |
| 5,254,519 | 10/1993 | Wan et al. | 502/252 |
| 5,597,771 | 1/1997 | Hu et al. | 502/304 |

FOREIGN PATENT DOCUMENTS

| | | |
|---|---|---|
| 615721 | 8/1989 | Australia . |
| 0 556 554 A2 | 8/1993 | European Pat. Off. ........ B01D 53/36 |
| 50-145381 | 11/1975 | Japan . |
| 57-105240 | 6/1982 | Japan . |
| 59-052530 | 3/1984 | Japan . |
| 59-127649 | 7/1984 | Japan . |
| 60-019036 | 5/1985 | Japan . |
| 5031828 | 7/1985 | Japan . |
| 60-232253 | 11/1985 | Japan . |
| 71538 | 4/1987 | Japan . |
| 63-007895 | 1/1988 | Japan . |
| 63-077544 | 4/1988 | Japan . |
| 63-205141 | 8/1988 | Japan . |
| 63-240947 | 10/1988 | Japan . |
| 01210032 | 8/1989 | Japan . |
| WO 95/35152 | 12/1995 | WIPO ............ B01D 53/94 |
| WO 97/43035 | 11/1997 | WIPO ............ B01D 53/94 |
| WO 98/09726 | 3/1998 | WIPO ............ B01J 23/56 |

OTHER PUBLICATIONS

U.S. application No. 08/645,985, Sung et al., filed May 14, 1996.

U.S. application No. 08/706,480, Sung, filed Sep. 4, 1996.

Primary Examiner—Michael Lewis
Assistant Examiner—Alexander G. Gmyka
Attorney, Agent, or Firm—Richard A. Negin

[57] ABSTRACT

A catalyst composition comprising at least one first supports, at least one first precious metal component, at least one second supports, and at least one second precious metal component. The total amount of the first precious metal component comprises from 1 to 99 weight percent based on the total of the first and second precious metal components. The surface area of the at least one first support is greater than the surface area of the at least one second support. Optionally or alternatively, the average particle size of the at least one first supports is greater than the average particle size of the at least one second supports. The present invention includes a method to prepare the catalyst composition and a method to use the catalyst composition as a three-way catalyst.

79 Claims, No Drawings

CATALYST COMPOSITION

RELATED APPLICATION

This application is a continuation-in-part of copending application Ser. No. 08/706,480 filed on Sep. 4, 1996.

BACKGROUND OF THE INVENTION

1. Field of the Invention

The present invention relates to a catalyst composition useful for the treatment of gases to reduce contaminants contained therein and method process to make the catalyst composition. More specifically, the present invention is concerned with improved catalysts of the type generally referred to as "three-way conversion" or "TWC" catalysts. These TWC catalysts are polyfunctional in that they have the capability of substantially simultaneously catalyzing the oxidation of hydrocarbons and carbon monoxide and the reduction of nitrogen oxides.

2. Discussion of Related Art

Three-way conversion catalysts (TWC) have utility in a number of fields including the treatment of exhaust from internal combustion engines, such as automobile and other gasoline-fueled engines. Emissions standards for unburned hydrocarbons, carbon monoxide and nitrogen oxides contaminants have been set by various governments and must be met, for example, by new automobiles. In order to meet such standards, catalytic converters containing a TWC catalyst are located in the exhaust gas line of internal combustion engines. The catalysts promote the oxidation by oxygen in the exhaust gas of the unburned hydrocarbons and carbon monoxide and the reduction of nitrogen oxides to nitrogen.

Known TWC catalysts which exhibit good activity and long life comprise one or more platinum group metals (e.g., platinum or palladium, rhodium, ruthenium and iridium) located upon a high surface area, refractory oxide support, e.g., a high surface area alumina coating. The support is carried on a suitable carrier or substrate such as a monolithic carrier comprising a refractory ceramic or metal honeycomb structure, or refractory particles such as spheres or short, extruded segments of a suitable refractory material.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

High surface area alumina support materials, also referred to as "gamma alumina" or "activated alumina", typically exhibit a BET surface area in excess of 60 square meters per gram ("$m^2/g$"), often up to about 200 $m^2/g$ or more. Such activated alumina is usually a mixture of the gamma and delta phases of alumina, but may also contain substantial amounts of eta, kappa and theta alumina phases. It is known to utilize refractory metal oxides other than activated alumina as a support for at least some of the catalytic components in a given catalyst. For example, bulk ceria, zirconia, alpha alumina and other materials are known for such use. Although many of these materials suffer from the disadvantage of having a considerably lower BET surface area than activated alumina, that disadvantage tends to be offset by a greater durability of the resulting catalyst.

In a moving vehicle, exhaust gas temperatures can reach 1000° C. or higher, and such elevated temperatures cause the activated alumina (or other) support material to undergo thermal degradation caused by a phase transition with accompanying volume shrinkage, especially in the presence of steam, whereby the catalytic metal becomes occluded in the shrunken support medium with a loss of exposed catalyst surface area and a corresponding decrease in catalytic activity. It is a known expedient in the art to stabilize alumina supports against such thermal degradation by the use of materials such as zirconia, titania, alkaline earth metal oxides such as baria, calcia or strontia or rare earth metal oxides, such as ceria, lanthana and mixtures of two or more rare earth metal oxides. For example, see C. D. Keith et al U.S. Pat. No. 4,171,288.

Bulk cerium oxide (ceria) is disclosed to provide an excellent refractory oxide support for platinum group metals other than rhodium, and enables the attainment of highly dispersed, small crystallites of platinum on the ceria particles, and that the bulk ceria may be stabilized by impregnation with a solution of an aluminum compound, followed by calcination. U.S. Pat. No. 4,714,694 of C. Z. Wan et al, discloses aluminum-stabilized bulk ceria, optionally combined with an activated alumina, to serve as a refractory oxide support for platinum group metal components impregnated thereon. The use of bulk ceria as a catalyst support for platinum group metal catalysts other than rhodium, is also disclosed in U.S. Pat. No. 4,727,052 of C. Z. Wan et al and in U.S. Pat. No. 4,708,946 of Ohata et al.

U.S. Pat. No. 4,808,564 discloses a catalyst for the purification of exhaust gases having improved durability which comprises a support substrate, a catalyst carrier layer formed on the support substrate and catalyst ingredients carried on the catalyst carrier layer. The catalyst carrier layer comprises oxides of lanthanum and cerium in which the molar fraction of lanthanum atoms to total rare earth atoms is 0.05 to 0.20 and the ratio of the number of the total rare earth atoms to the number of aluminum atoms is 0.05 to 0.25.

U.S. Pat. No. 4,438,219 discloses an alumina supported catalyst for use on a substrate. The catalyst is stable at high temperatures. The stabilizing material is disclosed to be one of several compounds including those derived from barium, silicon, rare earth metals, alkali and alkaline earth metals, boron, thorium, hafnium and zirconium. Of the stabilizing materials barium oxide, silicon dioxide and rare earth oxides which include lanthanum, cerium, praseodymium, neodymium, and others are indicated to be preferred. It is disclosed that contacting them with a calcined alumina film permits the calcined alumina film to retain a high surface area at higher temperatures.

U.S. Pat. Nos. 4,476,246, 4,591,578 and 4,591,580 disclose three-way catalyst compositions comprising alumina, ceria, an alkali metal oxide promoter and noble metals. U.S. Pat. Nos. 3,993,572 and 4,157,316 represent attempts to improve the catalyst efficiency of Pt/Rh based TWC systems by incorporating a variety of metal oxides, e.g., rare earth metal oxides such as ceria and base metal oxides such as nickel oxides. U.S. Pat. No. 4,591,518 discloses a catalyst comprising an alumina support with components deposited thereon consisting essentially of a lanthana component, ceria, an alkali metal oxide and a platinum group metal. U.S. Pat. No. 4,591,580 discloses an alumina supported platinum group metal catalyst. The support is sequentially modified to include support stabilization by lanthana or lanthana rich rare earth oxides, double promotion by ceria and alkali metal oxides and optionally nickel oxide. Palladium containing catalyst compositions e.g. U.S. Pat. No. 4,624,940 have been found useful for high temperature applications. The combination of lanthanum and barium is found to provide a superior hydrothermal stabilization of alumina which supports the catalytic component, palladium.

U.S. Pat. No. 4,294,726 discloses a TWC catalyst composition containing platinum and rhodium obtained by impregnating a gamma alumina carrier material with an aqueous solution of cerium, zirconium and iron salts or mixing the alumina with oxides of, respectively, cerium, zirconium and iron, and then calcining the material at 500 to 700° C. in air after which the material is impregnated with an aqueous solution of a salt of platinum and a salt of rhodium dried and subsequently treated in a hydrogen-containing gas at a temperature of 250–650° C. The alumina may be thermally stabilized with calcium, strontium, magnesium or barium compounds. The ceria-zirconia-iron oxide treatment is followed by impregnating the treated carrier material with aqueous salts of platinum and rhodium and then calcining the impregnated material.

U.S. Pat. No. 4,780,447 discloses a catalyst which is capable of controlling HC, CO and No, as well as $H_2S$ in emissions from the tailpipe of catalytic converter equipped automobiles. The use of the oxides of nickel and/or iron is disclosed as an $H_2S$ gettering compound.

U.S. Pat. No. 4,965,243 discloses a method to improve thermal stability of a TWC catalyst containing precious metals by incorporating a barium compound and a zirconium compound together with ceria and alumina. This is disclosed to form a catalytic moiety to enhance stability of the alumina washcoat upon exposure to high temperature.

J01210032 (and AU-615721) discloses a catalytic composition comprising palladium, rhodium, active alumina, a cerium compound, a strontium compound and a zirconium compound. These patents suggest the utility of alkaline earth metals in combination with ceria, and zirconia to form a thermally stable alumina supported palladium containing washcoat.

U.S. Pat. Nos. 4,624,940 and 5,057,483 refer to ceria-zirconia containing particles. It is found that ceria can be dispersed homogeneously throughout the zirconia matrix up to 30 weight percent of the total weight of the ceria-zirconia composite to form a solid solution. A co-formed (e.g. co-precipitated) ceria-zirconia particulate composite can enhance the ceria utility in particles containing ceria-zirconia mixture. The ceria provides the zirconia stabilization and also acts as an oxygen storage component. The '483 patent discloses that neodymium and/or yttrium can be added to the ceria-zirconia composite to modify the resultant oxide properties as desired.

U.S. Pat. No. 4,504,598 discloses a process for producing a high temperature resistant TWC catalyst. The process includes forming an aqueous slurry of particles of gamma or other activated alumina and impregnating the alumina with soluble salts of selected metals including cerium, zirconium, at least one of iron and nickel and at least one of platinum, palladium and rhodium and, optionally, at least one of neodymium, lanthanum, and praseodymium. The impregnated alumina is calcined at 600° C. and then dispersed in water to prepare a slurry which is coated on a honeycomb carrier and dried to obtain a finished catalyst.

U.S. Pat. Nos. 3,787,560, 3,676,370, 3,552,913, 3,545,917, 3,524,721 and 3,899,444 all disclose the use of neodymium oxide for use in reducing nitric oxide in exhaust gases of internal combustion engines. U.S. Pat. No. 3,899,444 in particular discloses that rare earth metals of the lanthanide series are useful with alumina to form an activated stabilized catalyst support when calcined at elevated temperatures. Such rare earth metals are disclosed to include lanthanum, cerium, praseodymium, neodymium and others.

TWC catalyst systems comprising a carrier and two or more layers of refractory oxide are disclosed. One of the purposes of using catalysts having two or more layers is to isolate constituents of compositions in different layers to prevent interaction of the catalysts.

Recent disclosures regarding catalysts comprising two or more layers are included in U.S. Ser. No. 08/645,985, U.S. Pat. Nos. 4,806,519 and 5,597,771, and in European Patent Application No. 95/35152. Other catalyst comprising two or more layers include Japanese Patent Publication No. 145381/1975, Japanese Patent Publication No. 105240/1982, Japanese Patent Publication No. 52530/1984, Japanese Patent Publication No. 127649/1984, Japanese Patent Publication No. 19036/1985, Japanese Patent Publication No. 31828/1985, Japanese Kokai 71538/87, JP-88-240947 and Japanese Patent J-63-077544-A Japanese Patent Publication No. 232253/1985, discloses a monolithic catalyst for purifying exhaust gases being in the shape of a pillar and comprising a number of cells disposed from an exhaust gas inlet side toward an exhaust gas outlet side. An alumina layer is formed on the inner wall surface of each of the cells, and catalyst ingredients are deposited on the alumina layer. The alumina layer consists of a first alumina layer on the inside and a second alumina layer on the surface side, the first alumina layer having palladium and neodymium deposited thereon, and the second alumina layer having platinum and rhodium deposited thereon.

U.S. Pat. Nos. 3,956,188 and 4,021,185 disclose a catalyst composition having (a) a catalytically active, calcined composite of alumina, a rare earth metal oxide and a metal oxide selected from the group consisting of an oxide of chromium, tungsten, a group IVB metal and mixtures thereof and (b) a catalytically effective amount of a platinum group metal added thereto after calcination of said composite. The rare earth metals include cerium, lanthanum and neodymium.

Japanese Patent J-63-205141-A discloses a layered automotive catalyst in which the bottom layer comprises platinum or platinum and rhodium dispersed on an alumina support containing rare earth oxides, and a top coat which comprises palladium and rhodium dispersed on a support comprising alumina, zirconia and rare earth oxides.

Japanese Patent J-63-007895-A discloses an exhaust gas catalyst comprising two catalytic components, one comprising platinum dispersed on a refractory inorganic oxide support and a second comprising palladium and rhodium dispersed on a refractory inorganic oxide support.

U.S. Pat. No. 4,587,231 discloses a method of producing a monolithic three-way catalyst for the purification of exhaust gases. First, a mixed oxide coating is provided to a monolithic carrier by treating the carrier with a coating slip in which an active alumina powder containing cerium oxide is dispersed together with a ceria powder and then baking the treated carrier. Next platinum, rhodium and/or palladium are deposited on the oxide coating by a thermal decomposition. Optionally, a zirconia powder may be added to the coating slip.

U.S. Pat. No. 4,923,842 discloses a catalytic composition for treating exhaust gases comprising a first support having dispersed thereon at least one oxygen storage component and at least one noble metal component, and having dispersed immediately thereon an overlayer comprising lanthanum oxide and optionally a second support. The layer of catalyst is separate from the lanthanum oxide. The noble metal can include platinum, palladium, rhodium, ruthenium and iridium. The oxygen storage component can include the oxide of a metal from the group consisting of iron, nickel, cobalt and the rare earths. Illustrative of these are cerium, lanthanum, neodymium, praseodymium, etc.

U.S. Pat. No. 5,057,483, referred to above, discloses a catalyst composition suitable for three-way conversion of internal combustion engine, e.g., automobile gasoline engine, exhaust gases and includes a catalytic material disposed in two discrete coats on a carrier. The first coat includes a stabilized alumina support on which a first platinum catalytic component is dispersed. The first coat also includes bulk ceria, and may also include bulk iron oxide, a metal oxide (such as bulk nickel oxide) which is effective for the suppression of hydrogen sulfide emissions, and one or both of baria and zirconia dispersed throughout as a thermal stabilizer. The second coat, which may comprise a top coat overlying the first coat, contains a co-formed (e.g., co-precipitated) rare earth oxide-zirconia support on which a first rhodium catalytic component is dispersed, and a second activated alumina support having a second platinum catalytic component dispersed thereon. The second coat may also include a second rhodium catalytic component, and optionally, a third platinum catalytic component, dispersed as an activated alumina support.

It is a continuing goal to develop a three-way catalyst system which is inexpensive and stable. At the same time the system should have the ability to oxidize hydrocarbons and carbon monoxide while reducing nitrogen oxides to nitrogen.

SUMMARY OF THE INVENTION

The present invention relates to a catalyst composition, method of preparing the composition, the method of using the composition and a catalyzed article.

The catalyst composition of the present invention comprises at least one first support and at least one first precious metal component located on the first support, and at least one second support and at least one second precious metal located on the second support. The present invention also includes a catalyst composition which comprises at least two first supports, at least one first precious metal component located on the first support, at least two second supports and at least one second precious metal component, and preferably at least two second precious metal components. The total amount of the first precious metal component comprises from 1 to 99, typically from 5 to 95, more typically from 20 to 80, yet more typically from 25 to 75 weight percent based on the total of the first and second precious metal components.

In a preferred embodiment the surface area of at least one first support is greater than the surface area of at least one second support. Surface area of the particulate supports is measured by any suitable procedure. A useful procedure is ASTM-D3663-78 which is summarized below and is also referred to as BET surface area expressed in meter square per gram ($m^2/g$).

In specific and preferred embodiments where there are at least two first supports and at least two second supports, a larger surface area first support has a greater surface area than a smaller surface area first support and a larger surface area second support has a greater surface area than a smaller surface area second support. In preferred embodiments the surface area of the at least one and preferably two first supports are in the range of about 50–300 $m^2/g$, and the surface area of the at least one second support is in the range of about 50–200 $m^2/g$ with the proviso that at least one first support has a greater surface area than at least one second support and preferably the average surface area of the at least one first support is greater than the average surface area of the at least one second support. More preferably the larger surface area first support is from about 100 $m^2/g$ to about 300 $m^2/g$ and the smaller surface area second support is from about 50 $m^2/g$ to about 150 $m^2/g$ wherein the surface area of the larger surface area first support is greater than the surface area of the smaller surface area first support. In another embodiment the surface area of the larger surface area second support is from about 50 $m^2/g$ to about 200 $m^2/g$ and the surface area of the smaller second support is from about 50 $m^2/g$ to about 150 $m^2/g$, with the surface area of the larger surface area second support being greater than the surface area of the smaller surface area second support. The recited surface areas are "initial" surfaces of the supports used to make the present compositions. Upon exposure to heating during processing and use, the surface area is expected to decrease.

The average particle size of the at least one and preferably two first supports is greater than the average particle size of the at least one and preferably two second supports. Where there are at least two first supports the average size of each of the two first supports can be about the same, and where there are at least two second supports the average particle size of the at least two second supports can be about the same. The amount of the at least one first precious metal is preferably from 50 to 99 and preferably 60 to 90 weight percent of the total of the at least one first support and at least one second support. The average particle size can be measured by any suitable means, and is preferably measured using a Brinkman Particle Size Analyzer as recited below.

The average particle size is reported as a percent of particles below a certain measured diameter. The average particle size of the at least two first supports preferably is 50% and more preferably 80% of the particles below 15 micrometers and more preferably below 15 micrometers. The average particle size of the at least two second supports is preferably 80% and more preferably 90% of the particles having a particle size below 15 and more preferably 10 micrometers. The average particle size of the first support is at least about 1, preferably at least about 2 and more preferably at least about 3 micrometers greater than the average particle size of the second support. Preferably, the average particle size of the at least one first supports is from 2 to 20 micrometers and more preferably 3 to 8 micrometers greater than the average particle size of the at least one second supports.

In the preferred catalyst composition of the present invention each of the first supports preferably have about the same average particle size and each of the second supports preferably have about the same average particle size.

Precious metals useful in the present invention include gold, silver and platinum group metals including palladium, platinum, rhodium, ruthenium and iridium. In a preferred embodiment of the present invention the at least one first precious metal comprises palladium and the at least one second precious metal comprises rhodium and its specific and preferred embodiments the at least one second precious metal component comprises rhodium and platinum. In a specific and preferred embodiment the palladium is the at least one first precious metal with substantially all of the palladium is located on the at least one first supports. The at least one second precious metal, rhodium or preferably rhodium and platinum are substantially located on at least one second supports with substantially all and preferably all of the rhodium located on the at least one second supports.

The palladium is separated from the rhodium to prevent an interaction of palladium and rhodium which is deleterious to catalytic activity. In preferred embodiments the platinum and rhodium are desired to be on the same supports to enhance a synergism which enhances catalytic activity.

Palladium generally is used to catalyze the oxidation of hydrocarbons. Palladium is particularly useful in greater amounts than precious metals such as platinum and rhodium. It is desired to locate the palladium on larger size particles with greater surface area to enhance the catalytic reaction of hydrocarbons to oxidize to form carbon dioxide and hydrogen. The palladium is on larger particles with high surface areas since it is present in the greater concentration. The high surface area first support particles are believed to be more receptive to mass transfer of hydrocarbons which are larger molecules than the carbon monoxide and nitrogen oxides. It is also believed that the larger particles tend to float to the surface of the layer so that the larger particle hydrocarbons contact the palladium supported catalyst in greater amount before the exhaust gas passes to the smaller particle platinum and rhodium supported catalyst.

Additionally, it is believed that the greater surface area of the larger particles for the higher concentration of palladium results in a more diffuse palladium crystal concentration and helps to prevent the palladium from agglomerating. Different surface area particles are also used since it is believed that the different surface area particles in the first and second precious metal components are used to create the different precious metal crystal sizes after aging to accommodate different sized hydrocarbon molecules in the exhaust gas. It is believed that a distribution of metal crystal sizes will result in better hydrocarbon conversion.

The advantage of using higher and lower surface area supports at the high temperatures, up to 1100° C. which the catalyst of the present invention experiences during use is particularly important. Aging at such temperatures tends to cause the supports to sinter. Typically, high surface area supports sinter faster at higher temperatures than lower surface area supports. Upon aging or exposure to higher temperatures when sintering occurs, the surface area reduces and precious metal crystals located on the first and second supports tend to agglomerate. This is because the distance between the precious metal crystals decreases as the surface area decreases. This is illustrated by the sintering of gamma alumina at a higher temperature to a-alumina. This phase change results in reduced support surface area with the a-alumina being more dense than the gamma-alumina. Precious metal such as palladium on the gamma-alumina accommodates as a result of the increased density and reduction of surface area. The present invention addresses the architectural design of catalysts by using the above recited at least one and at least two second supports having different surface areas. Preferably, there are at least two first supports and at least two second supports. The use of more than one support, e.g., first support and different second support and more preferably at least two first supports and at least two second supports results in a distribution of particle surface character upon aging and use at high temperatures. This is particularly advantageous when addressing the oxidation of hydrocarbons which are generally a plurality of different gaseous compounds. Each of the compounds has different molecular structure such as methane propane and butane in their gaseous form. By having different surface area particles the mass transfer of the hydrocarbons from the gas to the catalyst and receipt by the different surface area particles of the catalyst enhances the efficiency of the catalyst. Additionally, it permits the selective oxidation of the hydrocarbons by the first precious metal catalyst, preferably palladium which is preferably present in greater amounts than the second precious metal compounds which is preferably rhodium or platinum or a combination thereof. The different particle size of the first and second supports in preferred embodiments enhances the effect of the different first and second supports. Preferably, there are larger particle size first supports which have a greater area and support the more plentiful palladium precious metal component. This combination provides more sites for the hydrocarbons to diffuse. Additionally, the larger particles tend to move toward the top of the layer during the coating process so that the hydrocarbons in the gas encounter the large greater surface area first support containing the plentiful palladium component and enhance the contact with a distribution of hydrocarbons to results in lower temperature light-off and higher temperature thermal stability and efficiency of the catalyst.

The first and second supports can be the same or different materials, compounds or compositions and are preferably selected from the group from refractory oxide materials which more preferably include silica, alumina and titania compounds. Particularly preferred supports are activated, high surface compounds selected from the group consisting of alumina, silica, silica-alumina, alumino-silicates, alumina-zirconia, alumina-chromia and alumina-ceria.

In specific embodiments where there are at least two first supports and/or at least two second supports, the relative amounts of each of the two or more first supports is preferably from 10 to 60 weight percent and more preferably 20 to 50 weight percent of the at least one smaller surface area first support and correspondingly at least 20 to 90 weight percent and preferably 50 to 70 weight percent of the at least one larger surface area first support. Additionally, there is at least 10 to 80 weight percent and more preferably 30 to 60 weight percent of the at least one smaller surface area second support and correspondingly at least 0 to 60 weight percent and more preferably 10 to 40 of at least one larger surface area second support.

Other materials which can be included in the catalyst composition include at least one first rare earth metal, an oxygen storage composition, and optionally at least one stabilizer and optionally a zirconia compound. The first rare earth metal compound can be selected from the group consisting of lanthanum components and neodymium components. The oxygen storage composition can be in bulk form and preferably comprises at least one of cerium and praseodymium compounds. Useful oxygen storage compositions can comprise a refractory oxide in combination with the oxygen storage component such as a composition comprising ceria as an oxygen storage component and zirconia as a refractory oxide with a preferred ceria zirconia compound being a co-formed composite comprising up to 40% by weight of ceria.

The stabilizer can be any useful stabilizer for TWC catalyst compositions with preferred stabilizers including alkaline earth metal components derived from a metal selected from the group consisting of magnesium, barium, calcium and strontium. The catalyst composition preferably comprises a zirconia compound and a rare earth oxide selected from lantana and neodymia. The catalyst composition can further comprise a nickel or iron component.

A preferred catalyst composition comprises, based on catalyst loading on a substrate, from about 0.001 to about 0.3 g/in$^3$ of at least one first precious metal component, from about 0.15 to about 2.0 g/in$^3$ of the at least one first supports, from about 0.001 to about 0.3 g/in$^3$ of at least one second precious metal component, from about 0.15 g/in$^3$ to about 2.0 g/in$^3$ of the at least one second supports, from about 0.025 to about 0.5 g/in$^3$ of at least one alkaline earth metal components, from about 0.025 to about 0.5 g/in$^3$ of the zirconium component, and from about 0.025 to about 0.5 g/in$^3$ of at least one rare earth metal component selected from the group consisting of ceria metal components, lanthanum metal components and neodymium metal components. The composition can additionally comprise about 0.0 to 5 g/in$^3$ and preferably about 0.5 g/in$^3$ to 3 g/in$^3$ of a nickel compound. Additionally, the composition can comprise from 0.1 g/in$^3$ to about 2.0 g/in$^3$ of a particulate composite of zirconia and ceria and optionally, a rare earth component selected from lanthanum and neodymia. The particular zirconia and ceria compound comprises from 50 to 90 weight percent of zirconia and 10 to 40 weight percent ceria with up to 10 weight percent of a rare earth oxide selected from the group consisting of lantana, neodymia, yttria and mixtures thereof.

The catalyst composition of the present invention can be in the form of a pellet or in the form of layer supported on a substrate. The preferred substrate is a honeycomb catalyst carrier which can be made of metal or ceramic. The composition, in the form of a layer is supported on the substrate.

The present invention additionally includes a method of preparing the composition including the steps of forming a complete slurry over liquid vehicle and the catalyst composition where the catalyst composition comprises at least one first precious metal component supported on at least one first support and at least one second precious metal component supported on at least one second support, where the total amount of first precious metal component relative to the second precious metal is as recited above and the average particle size of the a least one first support is greater than the average particle size of the at least one first support is as recited above. In the preferred embodiment, the method further comprises the steps of forming at least one first slurry comprising at least one first precious metal component supported on at least one first support and forming a second slurry comprising at least one second precious metal component supported on at least one second support and mixing the first slurry and second slurry to make the complete slurry. The complete slurry can be deposited as a layer on the substrate.

The method can yet further comprise the steps of fixing at least one first precious metal component onto at least one first support and the at least one second precious metal component on the at least one second support. The precious metal which is fixed to the support can be segregated from components which may have a negative impact on the catalytic activity of that precious metal on other supports in the composition. The fixing step can be suitable fixing steps known in the art such as chemically fixing or thermally fixing. A preferred fixing step is to thermally fix the precious metal to the support. This is preferably conducted in air at from 50° C. to about 550° C. from 0.5 to about 2.0 hours. The method can additionally comprise steps of adding additional materials to either the first slurry or the second slurry including materials such as at least one rare earth metal component, an oxygen storage component, at least one stabilizer and/or a zirconia component.

The method of the present invention can further comprise the steps of making at least one precious metal component supported on at least one first support and at least one second precious metal component supported on at least one second support. This can be accomplished by mixing a solution of at least one water-soluble first precious metal component and at least one first finely divided, high surface area, refractory oxide support which is sufficiently dry to absorb essentially all of the solution. The first precious metal is fixed to the at least one first support to form a first frit of supported precious metal component. The first frit particle size can be reduced by suitable milling means. Similarly, the process can include the step of separately mixing a solution of at least one water soluble second precious metal component and at least one second finely divided, high surface area, refractory oxide support which is sufficiently dried to adsorb essentially all of the solution. The second precious metal can be fixed as a second support to form a second frit of supported precious metal component and the particle size of the second frit can be reduced by suitable milling means. The step of adding additional materials to the first or second slurry can be conducted by adding the materials to a slurry selected from the group comprising of a first slurry comprising the first frit or a second slurry comprising the second frit.

Finally, the method can comprise a step of coating a substrate with the complete slurry. The present invention enables supported larger first frit particles to float above the smaller second frit particles during coating and have some segregation within a single layer of washcoat. This enables the avoidance of deleterious interaction of supported components such as precious metals with each other and with other components which are supported on different supports. Additionally, this permits the application of the single layer which achieves the advantage of a comparable catalyst architecture having two or more layers. Multiple layers of the same or different compositions within the scope of the present invention can be applied and advantage taken of the use of the different diameter supports and segregation and distribution of materials within each separate layer.

DETAILED DESCRIPTION OF THE PREFERRED EMBODIMENTS

The present invention is directed to a catalyst composition of the type useful as a three-way conversion catalyst or a TWC. The TWC catalyst composite of the present invention can simultaneously catalyzes the oxidation of hydrocarbons and/or carbon monoxide and the reduction of nitrogen oxides present in a gas stream.

The catalyst composition of the present invention is directed to a method of using the catalyst composition and a method of preparation of the catalyst composition. The present invention also includes a pellet or supported layer of the catalyst composition. The layer can be supported on a suitable substrate such as a monolithic catalyst honeycomb.

The catalyst composition comprises at least one and preferably two first supports, at least one first precious metal component, at least one and preferably two second supports, and at least one second precious metal component. The catalyst composition of the present invention comprises at least one first support and at least one first precious metal component located on the first support, and at least one second support and at least one second precious metal located on the second support. The total amount of the first precious metal component comprises from 1 to 99, typically from 5 to 95, more typically from 20 to 80, yet more typically from 25 to 75 weight percent based on the total of the first and second precious metal components.

In a preferred embodiment the surface area of at least one first support is greater than the surface area of at least one second support. Surface area of the particulate supports is measured by any suitable procedure. A useful procedure is ASTM-D3663-78, also referred to as BET surface area expressed in meter square per gram (m²/g). Briefly, the procedure is the determination of surface area using an automated nitrogen adsorption apparatus. Useful apparatus include the Quantachrome Autosorb-6 or the Micrometrics ASAP2400. The surface area is determined by measuring the volume of nitrogen gas adsorbed by the sample at several pressure levels. The BET (1) equation in its linear form is then used to determine the volume of adsorbed gas equivalent to a monomolecular layer. This is done by fitting a straight line to three relative pressure points (0.08, 0.014 and 0.20) on the linear portion of the isotherm, and determining the slope and intercept corresponding to the line of least squares. From the slope and the effective cross-sectional area of a single $N_2$ molecule (0.162 nm²), the surface area of the sample is calculated.

In specific and preferred embodiments where there are at least two first supports and at least two second supports, a larger surface area first support has a greater surface area than a smaller surface area first support and a larger surface area second support has a greater surface area than a smaller surface area second support. In preferred embodiments the surface area of the at least one and preferably two first supports are in the range of about 50–300 m²/g, and the surface area of the at least one second support is in the range of about 50–200 m²/g with the proviso that at least one first support has a greater surface area than at least one second support and preferably the average surface area of the at least one first support is greater than the average surface area of the at least one second support. More preferably the larger surface area first support is from about 100 m²/g to about 300 m²/g and the smaller surface area second support is from about 50 m²/g to about 150 m²/g wherein the surface area of the larger surface area first support is greater than the surface area of the smaller surface area first support. In another embodiment the surface area of the larger surface area second support is from about 50 m²/g to about 200 m²/g and the surface area of the smaller second support is from about 50 m²/g to about 150 m²/g, with the surface area of the larger surface area second support being greater than the surface area of the smaller surface area second support. The recited surface areas are "initial" surfaces of the supports used to make the present compositions. Upon exposure to heating during processing and use, the surface area is expected to decrease. Where there are at least two first supports and at least two second supports, the at least two first supports preferably comprise at least one smaller surface area first support and at least one larger surface area first support. The at least two second supports preferably comprise at least one smaller area second support and at least one larger surface area second support. More preferably the larger surface area first support has a greater surface area than the smaller surface area first support, and the larger surface area second support has a greater surface area than the larger surface area second support. In specific and preferred embodiments the surface area of the at least two first supports are in the range of from 50 to 300 m²/g, and the surface area of the at least two second supports are in the range of from about 50 to about 250 m²/g. In a more preferred and specific embodiment, the surface area of the larger surface area first support is from about 100 to 250 m²/g and the smaller surface area second support is from about 50 to 200 m²/g, where the initial surface area of the larger surface area first support is greater than the initial surface area of the smaller surface area first support. By initial surface area, it is meant the surface area of the support material which is used to prepare the catalyst composition.

In accordance with a specific and preferred embodiment of the present invention the average particle size of the at least one and preferably two first supports is greater than the average particle size of the at least two second supports. The first precious metal can be supported on the first support and the second precious metal can be supported on the second support. The use of different particle size first supports and second supports to support the first and second precious metal components can result in segregation of the supported precious metals and other components supported on the first and second support. Additionally, the use of different size refractory oxide supports can result in some distribution of the support particles when a slurry of the composition is deposited as a pellet or single layer. The at least one or two first supports and as well as the at least one or two second supports can be the same or different support components. The support preferably comprises a high surface area refractory oxide support. The average particle size of the first support is greater than the average particle size of the second support. For the purpose of the present invention, particle size is measured using a Brinlman particle size analyzer. For useful operating procedures reference is made to Sections 1–4 of the Brinkman Particle Size Analyzer operator's manual Version 4.1 10/1987, herein incorporated by reference. The particle size distribution is indicated by a percent of particles having an average particle diameter less than a given number in micrometers. Typically, the particles of the at least two first supports and the at least two second supports have at least 80% of the particles having an average diameter of less than 30 micrometers and preferably the first support has 80% of the particles having an average diameter of less than 20 micrometers and the at least second support has at least 80%, and preferably at 90% of the particles having an average diameter of less than 10 micrometers. Nominally, particles of precious metal and other components supported on a support are considered to be included with particle size measurement of the support.

Preferably, the at least one first supports supporting a precious metal component comprises a refractory oxide such as a mixture of high surface area aluminas supporting a precious metal component comprising palladium has a preferred particle size of 80% of the particles being less than 10 to 20 micrometers and the at least one second support supporting a precious metal component comprises a mixture of high surface area alumina and co-formed ceria zirconia has an average particle size of 90% of the particles being less than 8 to 10 micrometers.

Useful high surface area supports include one or more refractory oxides. These oxides include, for example, silica and alumina, include mixed oxide forms such as silica-alumina, aluminosilicates which may be amorphous or crystalline, alumina-zirconia, alumina-chromia, alumina-ceria and the like. The support is substantially comprised of alumina which preferably includes the members of the gamma or transitional alumina, such as gamma and eta aluminas, and, if present, a minor amount of other refractory oxide, e.g., about up to 20 weight percent. Desirably, the active alumina has a specific surface area of 60 to 350 m²/g.

Preferably, one of the first precious metal components and second precious metal components comprises at least one precious metal not present in the other precious metal component. In a most preferred embodiment, the at least one of the first precious metal component comprises a palladium component in the absence of significant amounts of rhodium and preferably in the absence of any rhodium, and the at least one second precious metal component comprises a rhodium component in the absence of significant amounts of palladium and preferably in the absence of any palladium. By a significant amount of rhodium or palladium is meant, an amount sufficient to measurably interact with the other to reduce catalytic activity. In this way, a single layer catalyst can be deposited which contains palladium and rhodium on separate first and second supports respectively and further the larger size of the first support can result in at least some of the larger first support particles deposited from a slurry which has a greater percent of palladium supported on the first supports toward the top half of the layer and a greater distribution of rhodium supported on the second support toward the bottom half of the deposited layer. In accordance with this architecture, the palladium and rhodium components are separated and the interaction upon aging at high temperatures which could compromise catalytic activity is minimized.

The use of the larger particle size at least one first support results in advantages when using large concentrations of precious metals such as palladium on a support. The use of the larger particle size coupled with greater surface area results in the deposited precious metal being widely distributed. The use of different surface area particles, particularly with the first particle support but as well with the second particle supports results in more efficient catalysis of varied hydrocarbon molecules. As discussed above, the use of different surface area supports in the ranges of the present invention is believed to enhance high temperature catalyst performance. The use of platinum and rhodium located on the at least one second supports in proximity results in a synergism which enhances catalytic activity.

A gas stream containing hydrocarbons, carbon monoxide and/or nitrogen oxides initially encounters a greater concentration of palladium on the larger particle size first supports of the supported first precious metal component which is designed to effectively catalytically oxidize hydrocarbons while causing some oxidation of carbon monoxide. This is particularly useful to treat gaseous hydrocarbons when the exhaust gas is at lower temperature. Thus, enhancing performance during conditions such as during cold starts of the engine. The gas also passes to amount of the supported second precious metal component designed to convert pollutants, including the reduction of nitrogen oxides, oxidation of hydrocarbons and remaining carbon monoxide.

The supported first precious metal results in effective oxidation of hydrocarbons over wide temperature ranges for long periods of time. In the preferred composite the first frit comprises a catalytically effective amount of a palladium or platinum, palladium component, preferably palladium with typically 5 to 300 g/ft$^3$ and more typically 15 to 200 g/ft$^3$ and preferably 25 to 150 g/ft$^3$ of a palladium component.

The supported second precious metal layer preferably comprises a second rhodium component and optionally and preferably a second platinum component. The amount of rhodium component on the second support is from 0.1 to about 20, preferably from 0.5 to 15 g/ft$^3$. The supported second precious metal preferably contains from 50 to 100 weight percent of the rhodium component based on the total rhodium metal in the first and second frit. Platinum can be used at from 0 to 100 g/ft$^3$, and typically at least 0.1 g/ft$^3$ and more typically 0.5 to 5.0 and more preferably from 5 to 75 g/ft$^3$ by weight of platinum component.

The preferred palladium component on the at least one or two first supports used in a layer to coat a monolithic honeycomb substrate comprises a loading of from 5 to 300 g/ft$^3$. Preferably, the amount of the high surface area alumina used will result in a palladium area concentration between 0.1 to 1.0 mg/m$^2$, preferably about 0.4 mg/m$^2$. The preferred loading of rhodium as a second precious metal on the at least one or two second supports of alumina composite is preferably about 2 to 20 g/ft$^3$ and preferably 4 to 10 g/ft$^3$ which corresponds to about 0.05 to 0.12 mg/m$^2$. It is known that the palladium component and the rhodium component can interact with each other and form an alloy if in contact, losing their catalytic activity at high temperature. The present composition can be in the form of a single coat with the palladium and the rhodium preferably fixed on different supports and more preferably supports having different particle size.

The preferred catalyst of this invention comprises precious metals preferably platinum group metal components present in an amount sufficient to provide compositions having significantly enhanced catalytic activity to oxidize hydrocarbons and carbon monoxide and reduce nitrogen oxides. The location of the platinum group metal components, particularly the rhodium component and palladium component and the relative amounts of rhodium components are the respective first and second supports have been found to result in the above recited advantages.

In preparing the catalyst, a precious metal component such as a platinum group metal catalytic component can be a suitable compound, and/or complex of any of the platinum group metals may be utilized to achieve dispersion of the catalytic component on the above recited supports, preferably activated alumina and/or ceria-zirconia composite support particles. As used herein, the term "precious metal components" include gold, silver and "platinum group metal component" including the recited platinum, rhodium, platinum, ruthenium and iridium components and means any such platinum group metal compound, complex, or the like which, upon calcination or use of the catalyst decomposes or otherwise converts to a catalytically active form, usually, the metal or the metal oxide. Water soluble compounds or water dispersible compounds or complexes of one or more platinum group metal components may be utilized as long as the liquid used to impregnate or deposit the catalytic metal compounds onto the support particles does not adversely react with the catalytic metal or its compound or complex or the other components of the slurry, and is capable of being removed from the catalyst by volatilization or decomposition upon heating and/or the application of vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum group metals are preferred. For example, suitable compounds are chloroplatinic acid, amine solubilized platinum hydroxide such as hexahydroxymonoethanolamine complexes of platinum, rhodium chloride, rhodium nitrate, hexamine rhodium chloride, palladium nitrate or palladium chloride, etc. During the calcination step, or at least during the initial phase of use of the catalyst, such compounds are converted into a catalytically active form of the platinum group metal or a compound thereof, typically an oxide.

The performance of first and/or second platinum group precious metal components can be enhanced by the use of a stabilizer, preferably alkaline earth metals, promoters preferably selected from lanthanum and neodymium, and a zirconium component. An oxygen storage component is preferably also included. The oxygen storage component can be in any form, including bulk form, as part of a first oxygen storage composition, or impregnated as a solution where there can be intimate contact between the oxygen storage component and the platinum group metal components. Intimate contact occurs when the oxygen storage component is introduced in the form of a solution of a soluble salt which impregnates the support and other particulate material and then can be converted to an oxide form upon calcining. The oxygen storage component is any such material known in the art and preferably at least one oxide of a metal selected from the group consisting of rare earth metals, most preferably a cerium or praseodymium compound with the most preferred oxygen storage component being cerium oxide (ceria). A useful oxygen storage composition is a bulk composite comprising ceria and zirconia. This results in the oxygen storage component having minimum intimate contact with the platinum group metal components (i.e., the rhodium and palladium components) even where the platinum group metal components are supported on the bulk oxygen storage composition particles.

The oxygen storage component can be included by dispersing methods known in the art. Such methods can include impregnation onto the first or second support composition. The oxygen storage component can be in the form of an aqueous solution. Drying and calcining the resulted mixture in air results in an oxide of the oxygen storage component in intimate contact with the platinum group metal component. Typically, impregnation means that there is substantially sufficient liquid to fill the pores of the material being impregnated. Examples of water soluble, decomposable oxygen storage components which can be used include, but are not limited to, cerium acetate, praseodymium acetate, cerium nitrate, praseodymium nitrate, etc. U.S. Pat. No. 4,189,404 discloses the impregnation of alumina based support composition with cerium nitrate.

Alternatively, the oxygen storage composition can be included in the composition in bulk form. The bulk oxygen storage composition can comprise an oxygen storage component which is preferably a cerium group component preferably ceria or praseodymia, and most preferably ceria. By bulk form it is meant that the composition comprising ceria and/or praseodymia is present as discrete particles which may be as small as 0.1 to 15 microns in diameter or smaller, as opposed to having been dispersed in solution as cited above. A description and the use of such bulk components is presented in U.S. Pat. No. 4,714,694, hereby incorporated by reference. As noted in U.S. Pat. No. 4,727,052, also incorporated by reference, bulk form includes oxygen storage composition particles of ceria admixed with particles of zirconia, or zirconia activated alumina. It is particularly preferred to dilute the oxygen storage component as part of an oxygen storage component composition.

The oxygen storage component composition can comprise an oxygen storage component, preferably ceria and a diluent component. The diluent component can be any suitable filler which is inert to interaction with platinum group metal components so as not to adversely affect the catalytic activity of such components. A useful diluent material is a refractory oxide with preferred refractory oxides being of the same type of materials recited below for use as catalyst supports. Most preferred is a zirconium compound with zirconia most preferred. Therefore, a preferred oxygen storage component is a ceria-zirconia composite. There can be from 1 to 99, preferably 1 to 50, more preferably 5 to 30 and most preferably 10 to 25 weight percent ceria based on the ceria and zirconia. Another preferred oxygen storage composition can comprise a composite comprising zirconia, ceria and at least one rare earth oxide. Such materials are disclosed for example in U.S. Pat. Nos. 4,624,940 and 5,057,483, hereby incorporated by reference. Particularly preferred are particles comprising greater than 50% of a zirconia-based compound and preferably from 60 to 90% of zirconia, from 10 to 30 wt. % of ceria and optionally up to 10 wt. %, and when used at least 0.1 wt. %, of a non-ceria rare earth oxide useful to stabilize the zirconia selected from the group consisting of lanthana, neodymia and yttria.

The composition optionally and preferably comprises a component which imparts stabilization. The stabilizer can be selected from the group consisting of alkaline earth metal compounds. Preferred compounds include compounds derived from metals selected from the group consisting of magnesium, barium, calcium and strontium. It is known from U.S. Pat. No. 4,727,052 that support materials, such as activated alumina, can be thermally stabilized to retard undesirable alumina phase transformations from gamma to alpha at elevated temperatures by the use of stabilizers or a combination of stabilizers. While a variety of stabilizers are disclosed, the composition of the present invention preferably use alkaline earth metal components. The alkaline earth metal components are preferably alkaline earth metal oxides. In particularly preferred compositions, it is desirable to use strontium oxide and/or barium oxide as the compound in the composition. The alkaline earth metal can be applied in a soluble form which upon calcining becomes the oxide. It is preferred that the soluble barium be provided as barium nitrite or barium hydroxide and the soluble strontium provided as strontium nitrate or acetate, all of which upon calcining become the oxides.

In the composition, the amount of thermal stabilizer combined with the alumina may be from about 0.05 to 30 weight percent, preferably from about 0.1 to 25 weight percent, based on the total weight of the combined alumina, stabilizer and catalytic metal component.

The composition can contain a compound derived from zirconium, preferably zirconium oxide. The zirconium compound can be provided as a water soluble compound such as zirconium acetate or as a relatively insoluble compound such as zirconium hydroxide. There should be an amount sufficient to enhance the stabilization and promotion of the respective compositions.

The composition preferably contains at least one first promoter selected from the group consisting of lanthanum metal components and neodymium metal components with the preferred components being lanthanum oxide (lanthana) and neodymium oxide (neodymia). In a particularly preferred composition, there is lanthana and optionally a minor amount of neodymia. While these compounds are disclosed to act as stabilizers, they can also act as reaction promoters. A promoter is considered to be a material which enhances the conversion of a desired chemical to another. In a TWC the promoter enhances the catalytic conversion of carbon monoxide and hydrocarbons into water and carbon dioxide and nitrogen oxides into nitrogen and oxygen.

The lanthanum and/or neodymium are in the form of their oxides. Preferably, these compounds are initially provided in a soluble form such as an acetate, halide, nitrate, sulfate or the like to impregnate the solid components for conversion to oxides. It is preferred that in the promoter be in intimate contact with the other components in the composition including and particularly the platinum group metal.

The composition of the present invention can contain other conventional additives such as sulfide suppressants, e.g., nickel or iron components. If nickel oxide is used, an amount from about 1 to 25% by weight of the first coat can be effective, as disclosed in commonly owned Ser. No. 07/787,192, hereby incorporated by reference.

A particularly useful catalyst composition of the present invention comprises from about 0.001 to 0.3 g/in$^3$ of a first precious metal such as a palladium component; about 0.15 to about 1.5 g/in$^3$ of the at least one first supports, i.e., alumina; at least one second precious metal such as from about 0.0 to 0.2 g/in$^3$ of a platinum component and from about 0.001 to 0.02 g/in$^3$ of the rhodium component as a second precious metal component and from about 0.1 g/in$^3$ to about 1.5 g/in$^3$ of the at least one second supports, i.e., alumina and ceria-zirconia component; at least about 0.05 g/in$^3$ and preferably from about 0.1 to about 1.0 g/in$^3$ of an oxygen storage component, preferably a composite of ceria and zirconia; from about 0.01 to about 0.5 g/in$^3$ of at least one alkaline earth metal components; from about 0.025 to about 0.5 g/in$^3$ of a zirconium component; and from about 0.0 to about 0.5 g/in$^3$ of at least one rare earth metal component selected from the group consisting of lanthanum metal components and neodymium metal components. The composition can further comprise from about 0.025 g/in$^3$ to about 0.5 g/in$^3$ of a nickel component. The particulate composite of zirconia and ceria can comprise 50 to 90 wt. % zirconia, 10 to 40 wt. % ceria and from 0 to 10 wt % rare earth oxides comprising lanthana, neodymia and mixtures thereof. Components other than the supports and precious metal components can be added to the first or second slurries.

The catalyst composition can be coated as a layer on a monolithic substrate generally which can comprise from about 0.50 to about 6.0, preferably about 1.0 to about 5.0 g/in$^3$ of catalytic composition based on grams of composition per volume of the monolith.

The catalyst composition of the present invention can be made by any suitable method. A preferred method comprises mixing a first mixture of a solution of at least one water-soluble, first palladium component, and at least one finely-divided, high surface area, refractory oxides which is sufficiently dry to absorb essentially all of the solution to form a first slurry. The first palladium are preferably comminuted in the first slurry. Preferably, the slurry is acidic, having a pH of less than 7 and preferably from 2 to 7. The pH is preferably lowered by the addition of an acid, preferably acetic acid to the slurry. In particularly preferred embodiments the first slurry is comminuted to result in substantially all of the solids having particle sizes of less than about 20 micrometers in average diameter. The first supported palladium component in the resulting first slurry can be a water insoluble form by a fixing step. The palladium component can be converted to insoluble form thermally, chemically or by calcining at about 50° C. to 550° C. for from 0.5 to 2.0 hours.

A second mixture of a solution of at least one water-soluble rhodium component and optionally at least one water-soluble platinum component, and at least one finely-divided, high surface area, refractory oxides which is sufficiently dried to absorb essentially all of the solution is mixed. The second platinum component and second rhodium component are added to water to form a second slurry and preferably comminuted in the second slurry. Preferably, the second slurry is acidic, having a pH of less than 7 and preferably from 3 to 7. The pH is preferably lowered by the addition of an acid, preferably acidic acid to the slurry. In particularly preferred embodiments the second slurry is comminuted to result in substantially all of the solids having particle sizes of less than 10 micrometers in average diameter. The supported rhodium group component and platinum component can be in the resulting second mixture in a water insoluble form. The platinum and rhodium components can be converted to insoluble form thermally, chemically or by calcining at about 50° C. to 550° C. for from 0.5 to 2.0 hours.

The first slurry containing a supported palladium component and the second slurry containing a supported rhodium component can be mixed to form a complete slurry. Additives such as oxygen storage components, stabilizers, rare earth metal components, and zirconium components and the like can be added either to the first slurry, to the second slurry or the complete slurry. Preferably the additional additives are added to the first or second slurry prior to a step of co-minuting the slurry.

Each of the first and second slurries useful for the present compositions can also be prepared by the method disclosed in U.S. Pat. No. 4,134,860 (incorporated by reference) generally recited as follows.

A finely-divided, high surface area, refractory oxide support is contacted with a solution of a water-soluble, catalytically-promoting metal component, preferably containing one or more platinum group metal components, to provide a mixture which is essentially devoid of free or unabsorbed liquid. The catalytically-promoting platinum group metal component of the solid, finely-divided mixture can be converted at this point in the process into an essentially water-insoluble form while the mixture remains essentially free of unabsorbed liquid. This process can be accomplished by employing a refractory oxide support, e.g., alumina, including stabilized aluminas, which is sufficiently dry to absorb essentially all of the solution containing the catalytically-promoting metal component, i.e., the amounts of the solution and the support, as well as the moisture content of the latter, are such that their mixture has an essential absence of free or unabsorbed solution when the addition of the catalytically-promoting metal component is complete. The composite remains essentially dry, i.e. it has substantially no separate or free liquid phase. During the latter process the metal component can be fixed on the support.

After the catalytically-promoting metal solution and the high area refractory oxide support are combined the catalytically-promoting metal component can be fixed on the support, i.e., converted to essentially water-insoluble form, while the composite remains essentially devoid of free or unabsorbed aqueous medium. The conversion may be effected chemically, by treatment with a gas such as hydrogen sulfide or hydrogen or with a liquid such as acetic acid or other agents which may be in liquid form, especially an aqueous solution, e.g. hydrazine. The amount of liquid used, however, is not sufficient for the composite to contain any significant or substantial amount of free or unabsorbed liquid during the fixing of the catalytically-promoting metal on the support. The fixing treatment may be with a reactive gas or one which is essentially inert; for example, the fixing may be accomplished by calcining the composite in air or other gas which may be reactive with the catalytically-promoting metal component or essentially inert. The resulting insoluble or fixed catalytically-promoting metal component may be present as a sulfide, oxide, elemental metal or in other forms. When a plurality of catalytically-promoting metal components are deposited on a support, fixing may be employed after each metal component deposition or after deposition of a plurality of such metal components.

The first and second slurries containing the fixed, catalytically-promoting metal component can be comminuted as a slurry which is preferably acidic, to provide solid particles that are advantageously primarily of a size of about 5 to 20 microns with the first slurry particle size being greater than the second slurry particle size. The slurries are mixed to result in a complete slurry which can be used to coat a macrosize carrier, typically having a low surface area, and the composite is dried and may be calcined. In these catalysts the composite of the catalytically-promoting metal component and high area support exhibits strong adherence to the carrier, even when the latter is essentially non-porous as may be the case with, for example, metallic carriers, and the catalysts have very good catalytic activity and life when employed under strenuous reaction conditions. Each of the first and second slurries can be mixed to form a complete slurry and applied as a layer supported on a substrate carrier and calcined of the present invention.

The method provides compositions of uniform and certain catalytically-promoting metal content since essentially all of the platinum group metal component thereby added to the preparation system remains in the catalyst, and the compositions contain essentially the calculated amount of the active catalytically-promoting metal components. In some instances a plurality of catalytically-active metal components may be deposited simultaneously or sequentially on a given refractory oxide support. The intimate mixing of separately prepared catalytically-promoting metal component refractory oxide composites of different composition made by the procedure of this invention, enables the manufacture of a variety of catalyst whose metal content may be closely controlled and selected for particular catalytic effects. The composition may have a platinum group metal component on a portion of the refractory oxide particles, and a base metal component on a different portion of the refractory oxide particles. It is, therefore, apparent that this process is highly advantageous in that it provides catalysts which can be readily varied and closely controlled in composition.

The comminution of the first and second slurries can be accomplished in a ball mill or other suitable equipment, and the solids content of the slurry my be, for instance, about 20 to 60 weight percent, preferably about 35 to 45 weight percent. The pH of each slurry is preferably below about 6 and acidity may be supplied by the use of a minor amount of a water-soluble organic or inorganic acid or other water-soluble acidic compounds. Thus the acid employed may be hydrochloric or nitric acid, or more preferably a lower fatty acid such as acetic acid, which may be substituted with, for example, chlorine as in the case of trichloroacetic acid. The use of fatty acids may serve to minimize any loss of platinum group metal from the support.

In making catalysts by this invention, the catalytically-active composition derived from the first and second slurries, having fixed or water-insoluble catalytically-promoting metal components and high area supports can be combined with a macrosize carrier, preferably of low total surface area. In order to deposit the catalytically-promoting group metal-support composite on the macrosized carrier, one or more comminuted complete slurries are applied to the carrier in any desired manner. Thus the carrier may be dipped or sprayed with the complete slurry, until the appropriate amount of slurry is on the carrier. The slurry employed in depositing the catalytically-promoting metal component-high area support composite on the carrier will often contain about 20 to 60 weight percent of finely-divided solids, preferably about 35 to 45 weight percent. Alternatively, the catalyst composition can be used in the form of a self-supporting structure such as a pellet. The composition can be prepared and formed into pellets by known means.

The comminuted catalytically-promoting metal component-high surface area support composite can be deposited on the carrier such as a metal or ceramic honeycomb in a desired amount, for example, the composite may comprise about 2 to 30 weight percent of the coated carrier, and is preferably about 5 to 20 weight percent. The composite deposited on the carrier is generally formed as a coated layer over most, if not all, of the surfaces of the carrier contacted. The combined structure may be dried and calcined, preferably at a temperature of at least about 250° C., but not so high as to unduly destroy the high area of the refractory oxide support, unless such is desired in a given situation.

The carriers useful for the catalysts made by this invention may be metallic in nature and be composed of one or more metals or metal alloys. The metallic carriers may be in various shapes such as pellets or in monolithic form. Preferred metallic supports include the heat-resistant, base-metal alloys, especially those in which iron is a substantial or major component. Such alloys may contain one or more of nickel, chromium, and aluminum, and the total of these metals may advantageously comprise at least about 15 weight percent of the alloy, for instance, about 10 to 25 weight percent of chromium, about 1 to 8 weight percent of aluminum and 0 to about 20 weight percent of nickel. The preferred alloys may contain small or trace amounts of one or more other metals such as molybdenum, copper, silicon, niobium, titanium and the like. The surfaces of the metal carriers may be oxidized at quite elevated temperatures, e.g. at least about 1000° C., to improve the corrosion resistance of the alloy by forming an oxide layer on the surface of carrier which is greater in thickness and of higher surface area than that resulting from ambient temperature oxidation. The provision of the oxidized or extended surface on the alloy carrier by high temperature oxidation may enhance the adherence of the refractory oxide support and catalytically-promoting metal components to the carrier.

Any suitable carrier may be employed, such as a monolithic carrier of the type having a plurality of fine, parallel gas flow passages extending therethrough from an inlet or an outlet face of the carrier, so that the passages are open to fluid flow therethrough. The passages, which are essentially straight from their fluid inlet to their fluid outlet, are defined by walls on which the catalytic material is coated as a "washcoat" so that the gases flowing through the passages contact the catalytic material. The flow passages of the monolithic carrier are thin-walled channels which can be of any suitable cross-sectional shape and size such as trapezoidal, rectangular, square, sinusoidal, hexagonal, oval, circular. Such structures may contain from about 60 to about 600 or more gas inlet openings ("cells") per square inch of cross section. The ceramic carrier may be made of any suitable refractory material, for example, cordierite, cordierite-alpha alumina, silicon nitride, zircon mullite, spodumene, alumina-silica magnesia, zircon silicate, sillimanite, magnesium silicates, zircon, petalite, alpha alumina and aluminosilicates. The metallic honeycomb may be made of a refractory metal such as a stainless steel or other suitable iron based corrosion resistant alloys.

Such monolithic carriers may contain up to about 600 or more flow channels ("cells") per square inch of cross section, although far fewer may be used. For example, the carrier may have from about 60 to 600, more usually from about 200 to 400, cells per square inch ("cpsi").

The catalytic compositions made by the present invention can be employed to promote chemical reactions, such as reductions, methanations and especially the oxidation of carbonaceous materials, e.g., carbon monoxide, hydrocarbons, oxygen-containing organic compounds, and the like, to products having a higher weight percentage of oxygen per molecule such as intermediate oxidation products, carbon dioxide and water, the latter two materials being relatively innocuous materials from an air pollution standpoint. Advantageously, the catalytic compositions can be used to provide removal from gaseous exhaust effluents of uncombusted or partially combusted carbonaceous fuel components such as carbon monoxide, hydrocarbons, and intermediate oxidation products composed primarily of carbon, hydrogen and oxygen, or nitrogen oxides. Although some oxidation or reduction reactions may occur at relatively low temperatures, they are often conducted at elevated temperatures of, for instance, at least about 150° C., preferably about 200° to 900° C., and generally with the feedstock in the vapor phase. The materials which are subject to oxidation generally contain carbon, and may, therefore, be termed carbonaceous, whether they are organic or inorganic in nature. The catalysts are thus useful in promoting the oxidation of hydrocarbons, oxygen-containing organic components, and carbon monoxide, and the reduction of nitrogen oxides. These types of materials may be present in exhaust gases from the combustion of carbonaceous fuels, and the catalysts are useful in promoting the oxidation or reduction of materials in such effluents. The exhaust from internal combustion engines operating on hydrocarbon fuels, as well as other waste gases, can be oxidized by contact with the catalyst and molecular oxygen which may be present in the gas stream as part of the effluent, or may be added as air or other desired form having a greater or lesser oxygen concentration. The products from the oxidation contain a greater weight ratio of oxygen to carbon than in the feed material subjected to oxidation. Many such reaction systems are known in the art.

The present invention is illustrated further by the following examples which are not intended to limit the scope of this invention.

EXAMPLE

First Slurry

In a Plantary mixer, 235 g of lower surface area alumina with a surface area of 160 m²/g, and 156 g of higher surface area alumina with a surface area of 250 m²/g were mixed. 170 g of $Pd(NO_3)_2$ solution at a Pd concentration of 21% was diluted with 100 g of deionized water ($DI-H_2O$) prior to impregnation onto the alumina mixture. This Pd/alumina powder was then transferred to a ball mill jar together with the following materials: SrOH: 200 g, Nd-nitrate: 176 g, ZrOH: 186 g and 115 g of $DI-H_2O$. 20 g of acetic acid was added to facilitate the milling process. After approximately 8 hours, the milled slurry showed a particle size distribution such that about 90% of its particles have a size of less than 10 micron. 192 g of La-nitrate was then added into the milled slurry, and the entire slurry milled for additional 10 minutes to ensure that the slurry was homogeneous. The rheology properties of the final slurry were: pH-5.3, viscosity-400 cps, and solid concentration-43.8 weight percent.

Second Slurry

In a second Plantary mixer, 100 g each of a lower surface area alumina with a surface area of 90 m²/g, and a higher surface area alumina with a surface area of 160 m²/g were blended. 33.6 g of Pt-solution (hexahydroxymonoethanolamine), and 50 g of $DI-H_2O$, were added into this alumina mix. 15 g of Rh-nitrate solution, along with 75 g of $DI-H_2O$ were then dripped onto the Pt/alumina mixture. After impregnation, the Pt/Rh/alumina mixture was transferred into a ball mill jar, together with the following: 156 g of stabilized Zr-Ce compound; 237 g of Zr-acetate; and 234 g of $DI-H_2O$. 17 g of acetic acid was added to facilitate the milling process. This slurry was ball milled until the particle size distribution showed that more than 90% of it is less than 8 micron. Rheology properties of the slurry: pH-4.7; viscosity-300 cps; solid concentration-48%. To avoid overcoating, the solid concentration was adjusted to 31% by adding $DI-H_2O$.

Coating

These two slurries were combined in a high shear mixer. After 30 minutes, the combined slurry properties were checked: pH-4.6; viscosity-181; and solid concentration—34.8 weight percent. Both full size monolith (3.66"D×2.5"L) and smaller core samples (1.5"D×3"L) were prepared via dipping the substrates into the slurry solution. The excess slurry was blown off by compressed air. These substrates were dried in a drying oven at 110° C. for an hour, then calcined at 550° C. for another hour. The resulting catalyst loading on the substrates after drying/calcination was 2.1 g/in³.

Test Results

A core sample prepared as in Example 1 was aged in a furnace with a gas containing 10% $H_2O$, 10% $H_2$, and the balance $N_2$, for 12 hours at 1100° C. After aging, this sample was evaluated in a reactor with a feed gas concentration as follows: $O_2$:0.4%, CO:0.3%, $H_2$:0.05%, $C_3H_6$:235 ppm, $C_3H_8$:235 ppm, $CO_2$:10%, NOx:1400 ppm, $H_2O$:10% and the balance of $N_2$. The results showed this catalyst to have excellent light-off and hot efficiency properties even after aging at 1100° C.

| Catalyst | Precious Metal Loading, g/ft³ | Light-Off, ° C. | | | Hot Efficiency @ 490° C. | | |
|---|---|---|---|---|---|---|---|
| | | HC | CO | NOx | HC | CO | NOx |
| A | 142 | 242 | 223 | 223 | 100 | 92 | 100 |

Light-off was measured by using the core samples in an enclosed reactor by comparing the inlet versus outlet HC, CO and NOx concentrations as the gas temperature at the immediate inlet position of the catalyst bed was increased at 10° C./minute. The light-off temperature is defined as the temperature at the immediate inlet position of the catalyst bed when 50% conversion was reached. Hot efficiency is defined as the conversion at steady state at a given inlet temperature. The steady state temperature of 490° C. was chosen to be representative of the operating temperature of an underfloor catalytic converter during Federal Testing Procedure conditions.

What is claimed:

1. A catalyst composition comprising:

at least one first support;

at least one first precious metal component located on the first support;

at least one second support;

at least one second precious metal component located on the second support;

wherein the surface area of said at least one first support is greater than the surface area of said at least one second support and the initial surface areas of said at least one first support and said at least one second support are at least 50 m$^2$/g.

2. A method comprising the steps of:
contacting a gas comprising nitrogen oxide, carbon monoxide and/or hydrocarbon with a catalyst composition comprising:
   at least one first support;
   at least one first precious metal component located on the first support;
   at least one second support;
   at least one second precious metal component located on the second support;
   wherein the surface area of said at least one first support is greater than the surface area of said at least one second support and the initial surface areas of said at least one first support and said at least one second support are at least 50 m$^2$/g.

3. A method comprising the steps of:
forming a complete slurry of a liquid vehicle and a catalyst composition comprising;
   at least one first precious metal component supported on at least one first support;
   at least one second precious metal component supported on at least one second support, where the surface area of said at least one first support is greater than the surface area of said at least one second support;
   forming at least one first slurry comprising the at least one first precious metal component supported on the at least one first support;
   forming at least one second slurry comprising the at least one second precious metal component supported on the at least one second support; and
   mixing said at least one first slurry and said at least one second slurry to make the complete slurry, wherein the initial surface areas of said at least one first support and said at least one second support are at least 50 m$^2$/g.

4. The method as recited in claim 3 further comprising the steps of:
   fixing the at least one first precious metal component onto the at least one first support; and
   fixing the at least two second precious metal components onto the at least one second support.

5. The method as recited in claim 4 wherein at least one of the fixing steps is a thermal fixing.

6. The method as recited in claim 3 wherein the thermal fixing is conducted from about 50° C. to about 550° C. for from 0.5 hours to about 2.0 hours.

7. The method as recited in claim 4 further comprising the step of:
   adding at least one of the following materials to a slurry selected from the group consisting of the first slurry and the second slurry:
      at least one rare earth metal component;
      an oxygen storage composition;
      at least one stabilizer; and
      a compound containing zirconium.

8. The method as recited in claim 3 further comprising the steps of:
   mixing a solution of at least one water-soluble first precious metal component and at least one first finely-divided, refractory oxide support which is sufficiently dry to absorb essentially all of the solution;
   fixing the first precious metal to the one first support to form a first frit mixture of supported first precious metal component;
   reducing the particle size of the first frit mixture;
   mixing a solution of at least two water soluble second precious metal components and at least one second finely-divided, high surface area, refractory oxide support which are sufficiently dry to absorb essentially all of the solution;
   fixing the second precious metal to the one second support to form a second frit mixture of supported second precious metal components; and
   reducing the particle size of the second frit mixture.

9. The method as recited in claim 8 further comprising the step of:
   adding at least one of the following materials to at least one slurry selected from the group consisting of a first frit first slurry and a second slurry comprising the second frit:
      at least one first rare earth metal component;
      an oxygen storage composition;
      at least one first stabilizer; and
      a zirconium compound.

10. The method as recited in claim 3 or 8 further comprising the step of coating a substrate with the complete slurry.

11. The catalyst composition as recited in claim 1 wherein the at least one first support comprises at least one smaller surface area first support and at least one larger surface area first support, and the at least one second support comprise at least one smaller surface area second support and at least one larger surface area second support.

12. The catalyst composition as recited in claim 1, wherein there are at least two first supports.

13. The catalyst composition as recited in claim 1, wherein there are at least two second supports.

14. The catalyst composition as recited in claim 1, 2 or 3 wherein there are at least two first supports and at least two second supports.

15. The catalyst composition as recited in claim 14 wherein the larger surface area first support has a greater surface area than the smaller surface area first support, and the larger surface area second support has a greater surface area than the smaller surface area second support.

16. The catalyst composition as recited in claim 15 wherein the surface area of the larger surface area first support is from about 100 to about 300 m$^2$/g and the smaller surface area second support is from about 50 to about 150 m$^2$/g wherein the initial surface area of the larger surface area first support is greater than the initial surface area of the smaller surface area first support.

17. The catalyst composition as recited in claim 1 wherein the surface area of the larger surface area second support is from about 50 to about 200 m$^2$/g and the smaller surface area second support is from about 50 to about 150 m$^2$/g wherein the initial surface area of the larger surface area second support is greater than the initial surface area of the smaller surface area second support.

18. The catalyst composition as recited in claim 1, wherein the average particle size of said at least one first support is greater than the average particle size of said at least one second support.

19. The catalyst composition as recited in claim 1, wherein each of the first supports has about the same average particle size, and wherein each of the second supports has about the same average particle size.

20. The catalyst composition as recited in claim 19 wherein the at least one first supports has a particle size of less than about 80% of the particles having a particle size of less than about 30 micrometers and the at least one second support has a particle size of less than about 90% of the particles having a particle size of less than about 10 micrometers.

21. The catalyst composition as recited in claim 20 wherein the at least one first supports has a particle size of less than about 80% of the particles having a particle size of less than about 20 micrometers and the at least one second support has a particle size of less than about 90% of the particles having a particle size of less than about 8 micrometers.

22. The catalyst composition of claim 1, wherein the average particle size of the at least one first supports is at least about one micrometer greater than the average particle size of the at least two second supports.

23. The catalyst composition of claim 22 wherein the average particle size of the at least one first supports is at least about two micrometers greater than the average particle size of the at least two second supports.

24. The catalyst composition of claim 1, wherein the at least one first precious metal component and the at least one second precious metal component, comprises at least one precious metal component not present in the other precious metal component.

25. The catalyst composition of claim 1, wherein the at least one first precious metal component comprises a palladium component and the at least one second precious metal component comprises a rhodium component.

26. The catalyst composition of claim 25 wherein the second precious metal further comprises rhodium.

27. The catalyst composition as recited in claim 14 wherein the at least two first supports are the same or different and are compounds selected from the group consisting of silica, alumina and titania compounds, and the two second supports are the same or different and are selected from the group consisting of silica, alumina and titania compounds.

28. The catalyst composition as recited in claim 27 wherein the at least one first and second supports are the same or different and are activated compounds selected from the group consisting of alumina, silica, silica-alumina, alumino-silicates, alumina-zirconia, alumina-chromia, and alumina-ceria.

29. The catalyst composition as recited in claim 28 wherein each of the at least one first and second supports are activated alumina.

30. The catalyst composition as recited in claim 1, further comprising a nickel or iron component.

31. The catalyst composition of claim 1, further comprising at least one component selected from the group consisting of:
    at least one rare earth metal component;
    an oxygen storage composition;
    at least one first stabilizer; and
    a compound containing zirconium.

32. The catalyst composition as recited in claim 31 wherein said at least one rare earth metal component is selected from the group consisting of lanthanum components and neodymium components.

33. The catalyst composition as recited in claim 31 wherein the oxygen storage composition is in bulk form.

34. The catalyst composition as recited in claim 33 wherein the oxygen storage component is selected from the group consisting of cerium and praseodymium compounds.

35. The catalyst composition as recited in claim 31 wherein the oxygen storage composition comprises a refractory oxide and a oxygen storage component.

36. The catalyst composition as recited in claim 33 wherein the oxygen storage composition comprises a ceria oxygen storage component and zirconia refractory oxide composite.

37. The catalyst composition as recited in claim 31 wherein the stabilizer is at least one alkaline earth metal component derived from a metal selected from the group consisting of magnesium, barium, calcium and strontium.

38. The catalyst composition as recited in claim 31 further comprising a particulate composite of zirconia compound and rare earth oxide.

39. The catalyst composition as recited in claim 38 wherein the rare earth oxide is ceria and, optionally, further comprises lanthana, neodymia and mixtures thereof.

40. The catalyst composition as recited in claim 14 wherein there is:
    from about 0.001 to about 0.3 $g/in^3$ of said at least one first precious metal component;
    from about 0.15 to about 2.0 $g/in^3$ of the two first supports;
    from about 0.001 to about 0.3 $g/in^3$ of said at least one second precious metal component;
    from about 0.15 $g/in^3$ to about 1.5 $g/in^3$ of two second supports;
    from about 0.025 to about 0.5 $g/in^3$ of at least one alkaline earth metal components;
    from about 0.025 to about 0.5 $g/in^3$ of a zirconium containing component; and
    from about 0.025 to about 0.5 $g/in^3$ of at least one rare earth metal component selected from the group consisting of ceria metal components, lanthanum metal components and neodymium metal components.

41. The catalyst composition as recited in claim 40 wherein the composition comprises from about 0.025 $g/in^3$ to about 0.5 $g/in^3$ of a nickel component.

42. The catalyst composition as recited in claim 41 further comprising from about 0.1 $g/in^3$ to about 1.0 $g/in^3$ of a particulate composite of zirconia and ceria and optionally further comprising a rare earth component selected from the group consisting of lanthana, neodymia and mixtures thereof.

43. The catalyst composition as recited in claim 1, in the form of a pellet.

44. The catalyst composition as recited in claim 1, in the form of at least one layer supported on a substrate.

45. The catalyst composition as recited in claim 44 wherein the substrate comprises a honeycomb carrier.

46. A catalyst composition comprising:
    at least two first supports;
    at least one first precious metal component located on the at least two first supports;
    at least two second supports;
    at least one second precious metal component located on the at least two second supports; wherein
    the total amount of the first precious metal component comprises from 1 to 99 weight percent based on the total amount of the first and second precious metal components, and the average particle size of the at least two first supports is greater than the average particle size of the at least two of the second supports.

47. A method comprising the steps of:
    contacting a gas comprising nitrogen oxide, carbon monoxide and/or hydrocarbon with a catalyst composition comprising:
    at least two first supports;
    at least one first precious metal component located on said at least two first supports;
    at least two second supports;
    at least one second precious metal component located on said at least two second supports; wherein the total amount of the first precious metal component comprises from 1 to 99 weight percent based on the total amount of the first and second precious metal components, and the average particle size of the at least two first supports is greater than the average particle size of the at least two second supports.

48. A method comprising the steps of:
forming a complete slurry of a liquid vehicle and a catalyst composition comprising:
at least one first precious metal component supported on at least two first supports;
at least one second precious metal component supported on at least two second supports, where the total amount of the first precious metal component comprises from 1 to 99 weight percent based on the total amount of the first and second precious metal components, and the average particle size of the at least two first supports is greater than the average particle size of the at least two second supports.

49. The method as recited in claim 48 further comprising the steps of:
forming at least one first slurry comprising the at least one first precious metal component supported on the at least two first supports;
forming at least one second slurry comprising the at least one second precious metal component supported on the at least two second supports; and
mixing said at least one first slurry and said at least one second slurry to make the complete slurry.

50. The method as recited in claim 48 further comprising the steps of:
fixing the at least one first precious metal component on to the at least one first support; and
fixing the at least one second precious metal components on to the at least one second support.

51. The method as recited in claim 48 further comprising the steps of:
mixing a solution of at least one water-soluble first precious metal component and at least two first finely-divided, refractory oxide supports which are sufficiently dry to absorb essentially all of the solution;
fixing the first precious metal to the at least two first supports to form a first frit mixture of supported first precious metal component;
reducing the particle size of the first frit mixture;
mixing a solution of at least two water soluble second precious metal component and at least two second finely-divided, refractory oxide supports which are sufficiently dry to absorb essentially all of the solution;
fixing the second precious metal to the at least two second supports to form a second frit mixture of supported second precious metal components; and
reducing the particle size of the second frit mixture.

52. The method as recited in claim 48 or 51 further comprising the step of coating a substrate with the complete slurry.

53. The catalyst composition as recited in claim 46, wherein the at least two first supports comprise at least one smaller surface area first support and at least one larger surface area first support, and the at least two second supports comprise at least one smaller surface area second support and at least one larger surface area second support.

54. The catalyst composition as recited in claim 53 wherein the larger surface area first support has a greater surface area than the smaller surface area first support, and the larger surface area second support has a greater surface area than the smaller surface area second support.

55. The catalyst composition as recited in claim 54 wherein the surface area of the at least two first supports is in the range of from about 50 to about 300 $m^2/g$, and the surface area of the at least two second supports is in the range of from about 50 to about 200 $m^2/g$.

56. The catalyst composition as recited in claim 55 wherein the surface area of the larger surface area first support is from about 100 to about 300 $m^2/g$ and the surface area of the smaller surface area second support is from about 50 to about 150 $m^2/g$ wherein the initial surface area of the larger surface area first support is greater than the initial surface area of the smaller surface area second support.

57. The catalyst composition as recited in claim 55 wherein the surface area of the larger surface area second support is from about 50 to about 200 $m^2/g$ and the surface area of the smaller surface area second support is from about 50 to about 150 $m^2/g$ wherein the initial surface area of the larger surface area second support is greater than the initial surface area of the smaller surface area second support.

58. The catalyst composition as recited in claim 46 wherein each of the at least two first supports has about the same average particle size, and wherein each of the at least two second supports has about the same average particle size.

59. The catalyst composition as recited in claim 58 wherein the at least two first supports have a particle size of less than about 80% of the particles having a particle size of less than about 30 micrometers and the at least one second supports have a particle size of less than about 90% of the particles having a particle size of less than about 10 micrometers.

60. The catalyst composition as recited in claim 59 wherein the at least two first supports have a particle size of less than about 80% of the particles having a particle size of less than about 20 micrometers and the at least one second supports have a particle size of less than about 90% of the particles having a particle size of less than about 8 micrometers.

61. A catalyst composition comprising:
at least two first supports;
at least one first precious metal component located on the at least two first supports;
at least two second supports;
at least one second precious metal component located on the at least two second supports; wherein
the total amount of the first precious metal component comprises from 1 to 99 weight percent based on the total amount of the first and second precious metal components, and the average particle size of the at least two first supports is at least about one micrometer greater than the average particle size of the at least two of the second supports.

62. The catalyst composition of claim 61 wherein the average particle size of the at least two first supports is at least about two micrometers greater than the average particle size of the at least two second supports.

63. The catalyst composition of claim 46 wherein the at least one of the at least one first precious metal component and the at least one second precious metal component, comprises at least one precious metal component not present in the other precious metal component.

64. The catalyst composition of claims 63 wherein the at least one of the first precious metal components comprises a palladium component and the at least one second precious metal components comprises a rhodium component.

65. The catalyst composition of claim 64 wherein the second precious metal further comprises rhodium.

66. The method as recited in claim 2 or 3 wherein the at least one first support comprises at least one smaller surface area first support and at least one larger surface area first support, and the at least one second support comprises at least one smaller surface area second support and at least one larger surface area second support.

67. The method as recited in claim 2 or 3 wherein there are at least two first supports.

68. The method as recited in claim 2 or 3 wherein there are at least two second supports.

69. The method as recited in claim 2 or 3 wherein there are at least two first supports and at least two second supports.

70. The method as recited in claim 69 wherein the larger surface area first support has a greater surface area than the smaller surface area first support, and the larger surface area second support has a greater surface area than the smaller surface area second support.

71. The method as recited in claim 70 wherein the surface area of the at least one first support is in the range of from about 50 to about 300 $m^2/g$, and the surface area of the at least one second support is in the range of from about 50 to about 200 $m^2/g$.

72. The method as recited in claim 70 wherein the surface area of the larger surface area first support is from about 100 to about 300 $m^2/g$ and the smaller surface area second support is from about 50 to about 150 $m^2/g$ wherein the initial surface area of the larger surface area first support is greater than the initial surface area of the smaller surface area first support.

73. The method as recited in claim 2 or 3 wherein the average particle size of said at least one first support is greater than the average particle size of said at least one second support.

74. The method as recited in claim 2 or 3 wherein each of the first support has about the same average particle size, and wherein each of the second supports has about the same average particle size.

75. The method as recited in claim 74 wherein the at least one first support has a particle size of less than about 80% of the particles having a particle size of less than about 30 micrometers and the at least one second support has a particle size of less than about 90% of the particles having a particle size of less than about 10 micrometers.

76. The method as recited in claim 75 wherein the at least one first support has a particle size of less than about 80% of the particles having a particle size of less than about 20 micrometers and the at least one second support has a particle size of less than about 90% of the particles having a particle size of less than about 8 micrometers.

77. The method of claim 2 or 3 wherein the average particle size of the at least one first support is at least about one micrometer greater than the average particle size of the at least two second supports.

78. The method of claim 77 wherein the average particle size of the at least one first support at least about two micrometers greater than the average particle size of the at least two second supports.

79. The method of claim 2 or 3 wherein the at least one first precious metal component and the at least one second precious metal component, comprises at least one precious metal component not present in the other precious metal component.

* * * * *